UNITED STATES PATENT OFFICE.

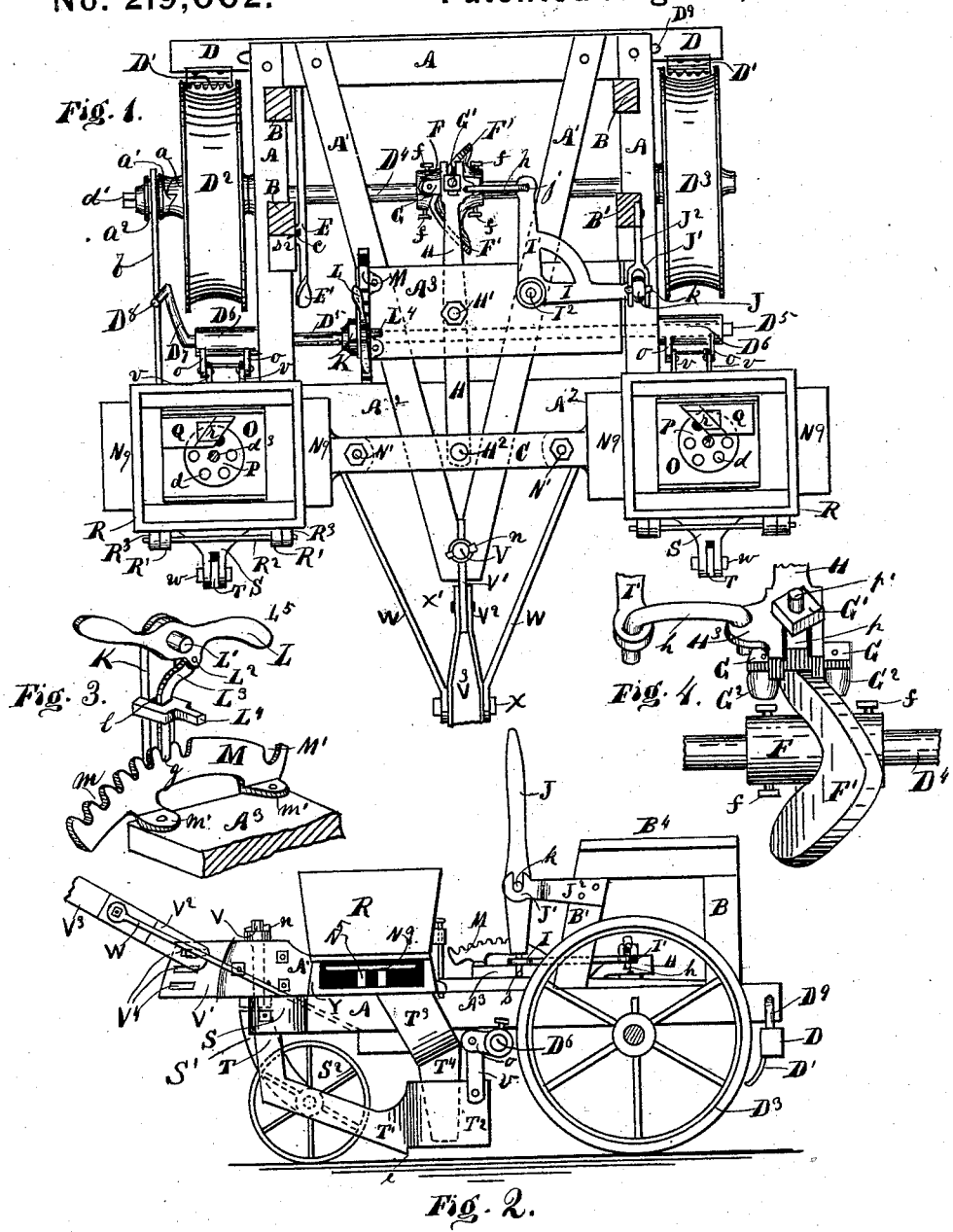

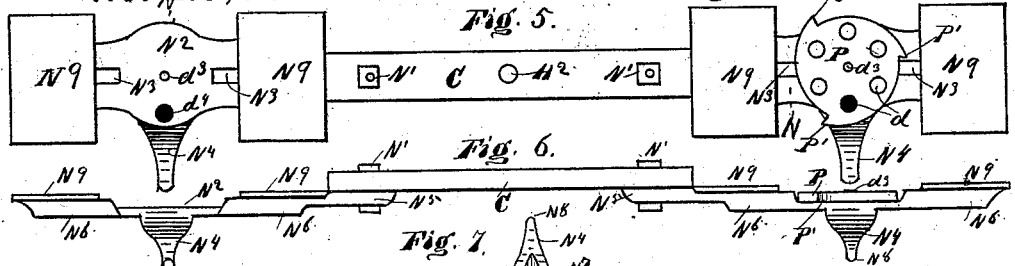
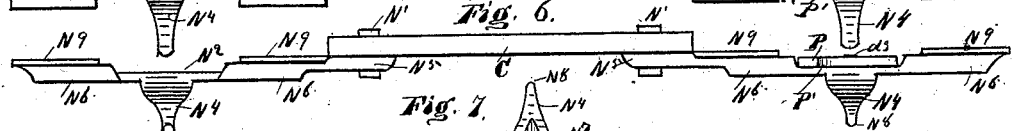
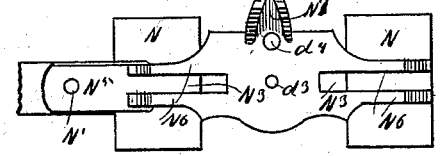
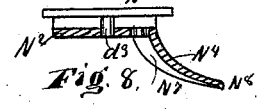
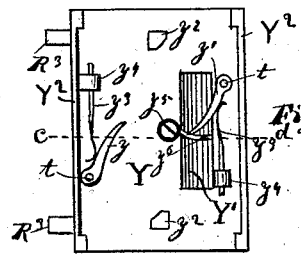
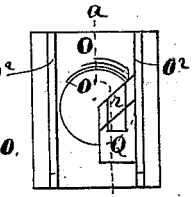
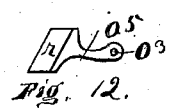
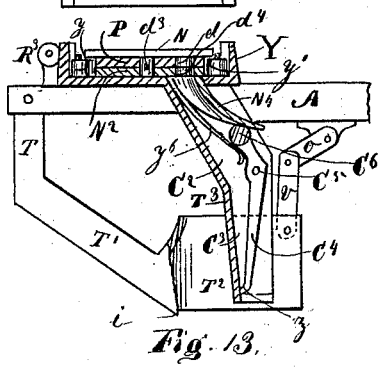
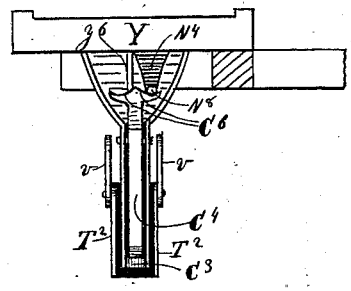

JAMES F. MOCK, OF MUNCIE, INDIANA.

IMPROVEMENT IN COMBINED DRILL AND CORN-PLANTER.

Specification forming part of Letters Patent No. 219,002, dated August 26, 1879; application filed August 19, 1878.

*To all whom it may concern:*

Be it known that I, JAMES F. MOCK, of Muncie, in the county of Delaware and State of Indiana, have invented a new and useful Improvement in Combined Drill and Corn-Planter, of which the following is a description, reference being had to the accompanying drawings.

My invention relates principally to a combined reciprocating and rotary feed, with an automatic drop-valve and devices for operating a corn planter and drill.

The object of my invention is to provide a combined corn planter and drill with a system of newly constructed and arranged devices, having new modes of operation for drilling and planting corn, by means of which a combined rotary and reciprocating motion is imparted to the feeding devices, and at the same time the seed-dropping valves are operated automatically; and, further, to provide a means of holding the plows up or down, and also of throwing the machinery into or out of gear with the driving-wheels, as hereinafter described, and set forth in the claims.

My invention consists of the new construction and arrangement of parts, and in the new combination of old elements, all of which, singly or combined, are deemed essential in my newly-organized drill and planter, as will be hereinafter fully set forth and described.

In the accompanying drawings, of which there are two sheets, like letters of reference in the different figures indicate like parts, in which—

Figure 1, Sheet 1, represents a top or plan view of my improved machine. Fig. 2, Sheet 1, is a side elevation of the same. Fig. 3, Sheet 1, is a perspective view of foot-lever and quadrant used for raising and lowering the plows, and also for throwing the driving-wheels in or out of gear. Fig. 4, Sheet 1, is a perspective view of the cam and devices for operating the reciprocating feed-slide. Fig. 5, Sheet 2, is a top view of the feed-slide. Fig. 6, Sheet 2, is a side view thereof. Fig. 7, Sheet 2, is a view of the bottom side of one end of the feed-slide. Fig. 8 is a sectional view of the feed-slide and lug for operating the drop-valve. Fig. 9 is a plan view of the box in which the feed-slide and rotary feed-disk operate. Fig. 10 is a plan view of the cut-off and cap-plate. Fig. 11 is a sectional view of Fig. 10, taken at the line $a\,b$. Fig. 12 is a side view of the cut-off. Fig. 13 is a sectional view of the feed-slide box, the grain-conducting spout, and plow. Fig. 14 is a rear view of the grain-conducting spout, the plow, and the operating devices.

A $A^1$ represent the frame, mounted on the driving-wheels $D^2$ $D^3$ by means of the axle $D^4$. The wheels have flanged rims and concave faces, and are located at each side of the frame, and immediately in the rear of the plows. The seat $B^4$ is mounted on standards B $B^1$, immediately over the axle $D^4$, and is of sufficient length to permit the driver to sit at one end, while the operator sits at the other end. In front of the seat $B^4$ is the foot-platform $A^3$, which is secured to the central frame-timbers, $A^1$ $A^1$. The shaft $D^5$ is mounted in suitable boxes attached to the side frames, A A, and is provided with a lever, K, which extends upward above the quadrant M, that is attached to the foot-board $A^3$. The lever K is provided with a double-ended foot-lever, L, that is pivoted at $L^1$. The lever K is also provided with a projecting lug, $L^4$, for the foot of the driver to rest on. The lug $L^4$ has a hole, $l$, near the lever K, that forms a guide, in which the pawl $L^3$ operates. The pawl $L^3$ is pivoted to the lever L at $L^2$, in such a manner that if the end $L^5$ of the lever L is raised, the end $g$ of the pawl will be raised out of the rack $m$ and allow the lever K to be moved forward or back, as will be hereinafter described. The shaft $D^5$ is provided with a crank, $D^7$ $D^8$, at one end for operating the clutch on the driving-wheel axle, which will be hereinafter described.

The sleeves $D^6$ $D^6$ are securely fastened on the shaft $D^5$, just outside of the frame A A. Each of these sleeves is provided with arms $o$ $o$, to which are pivoted the links $v$ $v$. These links are also pivoted to the sides $T^2$ $T^2$ of the plow, as shown. The perpendicular standard T of the plow-colter is pivoted to the end S of the frame at $w$, and the colter $T^1$, forming part of the standard T, has a straight incline to the plow.

The plow is formed of the two sides $T^2$ $T^2$, united to the colter $T^1$, and spread apart far enough to receive the grain-spout $T^4$, as shown.

At the union of the colter with the plow-side T² T² there is a downward projection, $i$, that is designed to open the ground below the bottom of the plow-side.

The hub of the driving-wheel D² is provided with a clutch, $a$, and the shaft D⁴ has a square end, $d^1$, on which operates a sliding clutch, $a^1$, with a groove, $a^2$, in it to receive the fork end of the lever $b$. The front end of this lever $b$ is secured to the side frame, A, under the feed-box.

By moving the lever K backward it operates the shaft D⁵, causing it to partially rotate, thus bringing the crank D⁷ D⁸ in contact with the spring-lever $b$, and throws the clutch $a$ out of gear at the same time the links $v\ v$ raise the plows from the ground.

The plows are lowered into the ground and the machine thrown into gear by a forward movement of the lever K, and the lever is held either forward or back by the pawl L³ engaging with the rack $m$ on the quadrant M.

At the front of the central frame timbers, A¹ A¹, is pivoted a caster-wheel, S², the fork S¹ passing up through the frame-timbers, and is held in position by the collar V⁴ and pin $n$, as shown.

In front of the caster-wheel, and also secured between the same central frame-timbers, A¹ A¹, is the clevis V¹, having several slots or holes, V⁴, as shown.

The tongue V³ is secured to the clevis V¹ by side plates, V², and the bolt X'.

The holes V⁴ are for the purpose of obtaining a shallow or deep draft on the plows.

The tongue V³ is braced by the braces W W, which are secured to the tongue by the bolt X, and to the front cross-frame, A² A², as shown.

At the rear of the frame is a bar, D, that is hinged to the rear cross-frame, A, and is provided at each end with a scraper, D¹.

The scraper-bar is operated by the lever E E', which has a side projection, $c$, that engages with a rack, $s^2$, on the upright o seat B. The rear end of the lever E is made fast to the bar D, and when the lever is depressed at the end E' the scrapers D¹ are moved away from the wheels; but when the lever is raised, then the scrapers clean the concave part of the wheels D² D³.

On the driving-shaft D⁴, near the center, is a cam, F¹, which has two motions to the right and two to the left with each revolution. The cam is secured to the shaft D⁴ by set-screws $f$ in the hub F, as shown.

The vibrating lever H is pivoted to the foot-platform A³ at H¹, and its rear end is provided with a fork. (Shown more fully in Fig. 4, Sheet 1.) One side of the fork is provided with a lug, H³, in which is a hole to receive one end of the link $h$, as shown.

Under the forked end of the lever H is a cross-bar, G, having a lug, $p$, that projects up in the fork, with a screw, $p'$, extending up above the fork, and a nut, G¹, for securing the bar, as shown.

At each end of the bar G are pivoted two rollers, G² G², that operate on each side of the cam F', as shown. Thus the lever H is vibrated when the cam F¹ revolves.

The link $h$ connects the lever H with a bell-crank lever, I I', that is also pivoted to the foot-platform A³, as shown.

The lever J is provided with two lugs or trunnions, $k\ k$, that operate in a fork, J¹, of the bracket J², which is secured to the seat-upright B¹.

The lower end of the lever J is provided with a pin, $s$, that operates in a hole formed in the end I of the bell-crank, the operation of which will be hereinafter described.

The front end of the vibrating lever H is pivoted to the bar C at H², and imparts a reciprocating motion to said bar and slides N N as the cam F' revolves. The box Y, in which the reciprocating feed-slide N and rotary feed-disk P operate, is formed with sides Y² Y², guide-posts $y^2\ y^2$, pawls $y\ y^1$, and springs $y^3\ y^3$, for operating the pawls $y\ y^1$, lugs $y^4\ y^4$, for holding the springs, hinges R³ R³, for attaching the grain-box, and a large rectangular hole, Y¹, forming a communication to the grain-spout T³, as shown in Fig. 9.

The reciprocating bar C is attached to the projecting ends N⁵ of the slides N N by the bolts N¹ N¹.

The slides N N form part of the bottom of the grain-box, and have a recess, with a bottom, N², on which the rotary ratchet feed-disk P operates on the stud $d^3$.

The bottom N² is provided with two slots, N³ N³, formed by the ribs N⁶ N⁶, Fig. 7. These slots are designed as guides for the slide N to operate on the studs $y^2\ y^2$, Fig. 9, Sheet 2.

The bottom N² is perforated with a hole, $d^4$, for grain to pass through into the opening Y¹, and then into the spout T³.

At the rear side of the bottom N² is a hollow curved lug or projection, N⁴, that looks through the opening Y¹ and projects into the grain-spout T³ below the slide N and box Y, as shown in Fig. 13, the operation of which will be hereinafter described.

The rotary disk P is provided with ratchet-teeth P' on its periphery, and a hole in the center to fit the stud $d^3$, on which it rotates. The disk is also provided with a series of grain-receiving holes, $d$, arranged at equal distances from the center and equal distance apart. These holes, when the disk is revolved, make connection with the hole $d^4$ in the bottom N² of the slide. The pawls $y\ y^1$ are mounted on the studs $t\ t$, and held against the ratchet-teeth P' by the springs $y^3 y^3$; and as the reciprocating slide N moves in either direction, the pawls $y\ y'$ cause the disk P to rotate sufficient to bring the holes $d$ in the disk directly over the hole $d^4$ in the bottom N² in an alternate manner, thus causing the grain contained in each hole of the disk to be discharged at regular intervals. The upper end of the grain-spout is made wide enough to take in the full length of the hole Y¹ of the bottom Y, and tapers downward to the straight spout $T^4$. This straight spout extends downward between the sides $T^2 T^2$ of the plow to near its bottom, and is provided with a valve, $C^4$, which is pivoted to the spout $T^4$ at $C^5$, and is provided at the upper end with a T-head, $C^6$. This head has a raised portion in the center and a curved depression at each side, as shown in Fig. 14. The lower end, $z$, of the valve $C^4$ is held against the front of the spout $T^4$ by the spring $y^6$, which is secured to the box Y, and acts on the valve above the pivot-bearing $C^5$, as shown in Fig. 13. The curved end $N^3$ of the hollow lug $N^4$ projects back far enough to operate on the curved T-head $C^6$ of the valve, and as the slide N is moved to one side or the other the end $N^3$, as it passes over the high part at the center of the valve, tilts it, and causes the lower end, $z$, to swing away from the front of the spout $T^4$, and allow any grain that has been deposited in the space $C^2 C^3$ to be dropped into the furrow formed by the plow $T^2 T^2$.

The cut-off Q is of peculiar construction, to wit: The case Q is made hollow, and provided with a beveled scraper, $r$, Fig. 12. This scraper has an arm, $O^5$, which projects back, and is provided with a hole, $O^3$, in which is inserted a pin that pivots the cut-off to the case Q, and a spring, $O^4$, is inserted between the arm $O^5$ and case Q to hold the cut-off $r$ down on the rotating disk P. The case Q is secured on the plate O, which fits in the space between the two plates $N^9 N^9$ of the slide N, and the cut-off $r$ projects down through said hole into the rotating disk P, with its beveled edge in position to scrape away from the holes $d$ all grain that is not designed to pass under the cut-off to the delivery-opening $d^4$ in the bottom $N^2$. The hole $O^1$ in the plate O is large enough to allow grain to freely enter all the holes $d$ in the disk P. The grain-box R is hinged to the box Y at $R^1 R^1$, to permit said box to be turned out of the way when it becomes necessary to get at the working parts of the slide N.

The operation of my machine is as follows, to wit: In transporting the machine from one place to another without operating the feed the lever K is thrown back and the pawl $L^3$ dropped into the notch $M'$ of the quadrant M, thus throwing the crank $D^7 D^8$ down and forcing the spring-lever $b$, with the clutch $a^1 a^2$, out of contact with the clutch $a$ on the wheel $D^2$, leaving the wheels free to revolve on the axle $D^4$. At the same time the rear ends of the plows are raised by means of the sleeves $D^6$, arms $o o$, and links $v v$, and the machinery is suspended on the caster-wheel $S^2$ and driving-wheels $D^2 D^3$. When it is desired to plant corn, the lever K is thrown forward, releasing the clutch $a^1 a^2$, and the spring $b$ forces said clutch in gear with the clutch $a$ on the wheel $D^2$, and motion is given to the axle $D^4$ and cam $F'$ at the same time the plows are lowered into the ground for planting. As the cam $F'$ revolves, the rollers $G^2 G^2$ on each side of the cam communicate a vibrating motion to the lever H, and it, in turn, imparts a reciprocating motion to the connecting-bar C and slides N N. Each slide, as it moves laterally, carrying with it the plate O, cut-off Q, and the ratchet-disk P, encounters the pawls $y y^1$ and causes the disk P to revolve until the holes $d$, one by one, reach the delivery-hole $d^4$, thus depositing the grain contained in each hole of the disk alternately into the spaces $C^2$ $C^3$ of the spout $T^3$, where the grain is retained between the valve $C^4$ and said spout until the slide N moves in the opposite direction; then the end $N^3$ of the projecting lug $N^4$ strikes the raised part $C^6$ at the center of the T-head of the valve $C^4$, and as the lug moves over it opens the valve at the bottom and deposits the grain in the furrow. As the lug $N^3$ passes over the raised part $C^6$ into the curved part of the T-head the valve is closed by the springs $y^6$, and another charge of grain is deposited behind the valve, to be again released as the lug $N^3$ again depresses the valve in its return motion. Thus each charge of grain from the rotary disk is held by the valve and deposited before another charge is introduced into the spout behind the valve.

When it is desired to plant corn in uneven ground, or where a regular feed will not be practicable, then the rollers $G^2 G^2$ are removed from the forked end of the lever H, and the bar and slides C N N are operated by the lever J, which imparts motion to the lever H by means of the bell-crank I $I'$ and link $h$, as shown.

If it is desired that the plows shall make a deep furrow, then the tongue $V^3$ is fastened in the upper hole, $V^4$, of the clevis. If a medium depth is required, the tongue is placed in the middle hole. If a light furrow is required, the tongue is placed in the lower hole.

What I claim as new, and desire to secure by Letters Patent, is—

1. The slide N, with lugs $N^4 N^3$, combined with the T-headed valve $C^4 C^6$, whereby the valve is opened or closed by the reciprocating motion of the slide, substantially as shown and described.

2. The T-headed valve $C^4 C^6$, pivoted to the spout $T^3$, combined with the spring $y^6$ and slide N, whereby the valve is opened and closed by the reciprocating motion of the slide, substantially as shown and described.

3. The slide N, with lugs $N^4 N^3$, guide-grooves $N^3 N^3$, and recessed bottom $N^2$, having delivery-opening $d^4$, combined with the rotary feed-disk P, having ratchet $P'$, the plate O, and box Y, having guides $y^2 y^2$ and oblong opening $Y^1$, substantially as shown and described.

4. The box Y, having an oblong opening, $Y^1$, pawls $y y^1$, and springs $y^3 y^3$, combined with the slide-bottom $N^2$, revolving feed-disk P, having a ratchet, $P'$, the slide N, and plate O, with cut-off, and the spout $T^3$, with T-headed valve $C^4 C^6$, substantially as shown and described.

5. The crank-shaft $D^5$, with crank $D^7$ $D^8$, combined with the lever K, foot-lever L, pawl $L^3$, foot-rest $L^4$, quadrant-rack M, spring-lever $b$, and plows $T^2$, whereby the plows are held up or down, and the clutch $a^1$ $a^2$ held out of or in gear with the driving-wheel, substantially as shown and described.

6. In combination with the crank-shaft $D^5$ $D^7$ $D^8$, with sleeve $D^6$, having arms $o$ $o$ and links $v$ $v$, the plow $T^2$, spring $b$, and clutch $a^1$ $a^2$, whereby the plows are lifted and the clutch $a^1$ $a^2$ disconnected from the driving-wheels, substantially as set forth and described.

7. In combination with the axle-shaft $D^4$, with a loosely-working driving-wheel, $D^2$, having a clutch, $a$, on the hub, the movable clutch $a^1$ $a^2$, operated on the square end of the shaft $D^4$ by the lever $b$, crank-shaft $D^5$ $D^7$ $D^8$, and lever K, whereby the driving-wheel is made to revolve the shaft $D^4$, or permit the wheel to revolve on said shaft, substantially as shown and described.

8. The T-headed valve $C^4$ $C^6$, pivoted to the spout $T^3$, combined with the spring $y^6$, slide N, and plow $T^2$, substantially as shown and described.

9. In a corn-planter, the combination of the rotary feed-disk P with ratchet $P^1$, pawls $y$ $y^1$, the slide N, with lugs $N^4$, and the T-headed valve $C^4$ $C^6$, substantially as shown and described.

In testimony whereof I have signed my name to this specification in the presence of two subscribing witnesses.

JAMES F. MOCK.

Witnesses:
C. M. DAVIS,
W. T. DAVIS.